(12) United States Patent
Chen et al.

(10) Patent No.: US 11,743,349 B2
(45) Date of Patent: Aug. 29, 2023

(54) SERVICE REQUEST HANDLING WITH PROTOCOL TRANSLATION

(71) Applicant: VMware, Inc., Palo Alto, CA (US)

(72) Inventors: Dongping Chen, Beijing (CN); Wei Wang, Beijing (CN); Bo Lin, Beijing (CN); Xiao Liang, Beijing (CN); Yi Zeng, Beijing (CN); Xinyu He, Beijing (CN); Dahui Yuan, Beijing (CN)

(73) Assignee: VMWARE, INC., Palo Alto, CA (US)

( * ) Notice: Subject to any disclaimer, the term of this patent is extended or adjusted under 35 U.S.C. 154(b) by 166 days.

(21) Appl. No.: 17/169,547

(22) Filed: Feb. 8, 2021

(65) Prior Publication Data

US 2022/0210232 A1    Jun. 30, 2022

(30) Foreign Application Priority Data

Dec. 29, 2020    (WO) ................. PCT/CN2020/140627

(51) Int. Cl.
| | |
|---|---|
| *G06F 15/173* | (2006.01) |
| *H04L 67/51* | (2022.01) |
| *H04L 41/0806* | (2022.01) |
| *G06F 9/455* | (2018.01) |
| *H04L 67/01* | (2022.01) |
| *H04L 67/561* | (2022.01) |

(52) U.S. Cl.
CPC .......... *H04L 67/51* (2022.05); *G06F 9/45558* (2013.01); *H04L 41/0806* (2013.01); *H04L 67/01* (2022.05); *H04L 67/561* (2022.05); *G06F 2009/45595* (2013.01)

(58) Field of Classification Search
CPC ..... H04L 67/51; H04L 41/0806; H04L 67/01; H04L 67/561; H04L 41/40; H04L 41/5051; H04L 67/02; H04L 67/565; G06F 9/45558; G06F 2009/45595
See application file for complete search history.

(56) References Cited

U.S. PATENT DOCUMENTS

| | | | |
|---|---|---|---|
| 2004/0139227 A1* | 7/2004 | Takeda | H04L 67/02 709/230 |
| 2005/0220139 A1* | 10/2005 | Aholainen | H04L 67/51 370/466 |
| 2018/0338002 A1* | 11/2018 | Sherrill | G06F 16/88 |

\* cited by examiner

*Primary Examiner* — John B Walsh
(74) *Attorney, Agent, or Firm* — SU IP Consulting

(57) ABSTRACT

Example methods and systems for service request handling with protocol translation are described. In one example, in response to intercepting a service request from a virtualized computing instance, a computer system may generate and send a translated service request towards a service node. The translated service request may be generated by performing a first translation of the service request from a service protocol to a data exchange protocol supported by both a client node running on the computer system and a service node. In response to receiving the service response that is generated according to the data exchange protocol from the service node, the computer system may generate and send a translated service response towards the virtualized computing instance. The translated service response may be generated by performing a second translation of the service response from the data exchange protocol to the service protocol.

18 Claims, 7 Drawing Sheets

ARP Table 250

| Service IP Address | Service MAC Address |
|---|---|
| IP-SERVICE | MAC-SERVICE |

Service redirect rules 260

| Match Field(s) | Action | |
|---|---|---|
| DIP=255.255.255.255,DPN=67 | CONFIG IP-DHCP | 261 |
| DIP=IP-DHCP,DPN=67 | TRANSLATE TO HTTP(S) | 262 |
| DIP=IP-SERVICE,DPN=PN-SERVICE | TRANSLATE TO HTTP(S) | 263 |

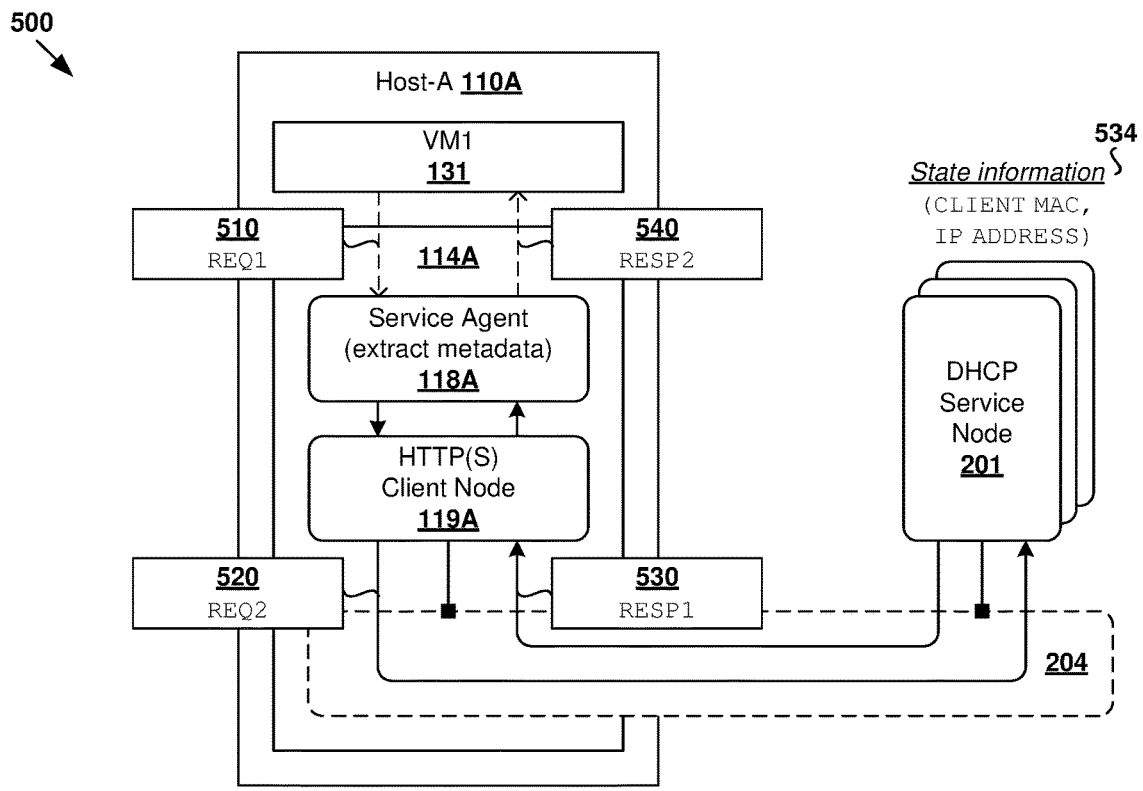

| 510<br>DHCP<br>DISCOVER<br>(REQ1) | SIP=0.0.0.0,SPN=68,DIP=255.255.255.255,DPN=67<br>TRANSLACTION ID:0xc18ceb14<br>CLIENT MAC:VM_99:d3:48(00:50:56:99:d3:48)<br>OPTION:(53)DHCP DISCOVER<br>OPTION:(50)REQUESTED IP ADDRESS (2.2.2.99)<br>... |
|---|---|
| 520<br>HTTPS<br>REQUEST<br>(REQ2) | HTTPS PUT https://<dhcp-service-http-server>/api/v1/dhcp-client  ⎫ 521<br>{ TRANSLACTION ID:0xc18ceb14<br>  CLIENT MAC:VM_99:d3:48(00:50:56:99:d3:48)<br>  OPTION:(53)DHCP DISCOVER   ⎬ 522<br>  OPTION:(50)REQUESTED IP ADDRESS (2.2.2.99)<br>  OPTION:(55)PARAMETER REQUEST LIST ... } |
| 530<br>HTTPS<br>RESPONSE<br>(RESP1) | HTTPS RESPONSE CODE: 200 OK ... ⎬ 531<br>RESPONSE HEADERS: CONTENT-TYPE: APPLICATION/JSON ⎬ 532<br>{ TRANSLACTION ID:0xc18ceb14<br>  CLIENT MAC:VM_99:d3:48(00:50:56:99:d3:48)<br>  YOUR (CLIENT) IP ADDRESS:2.2.2.99 ⎬ 533<br>  OPTION:(53)DHCP OFFER<br>  OPTION:(54)DHCP SERVER IDENTIFIER (2.2.2.1)<br>  OPTION:(51)IP ADDRESS LEASE TIME ... } |
| 540<br>DHCP<br>OFFER<br>(RESP2) | SIP=2.2.2.1,SPN=67,DIP=2.2.2.99,DPN=68<br>TRANSLACTION ID:0xc18ceb14<br>CLIENT MAC:VM_99:d3:48(00:50:56:99:d3:48)<br>YOUR (CLIENT) IP ADDRESS:2.2.2.99<br>OPTION:(53)DHCP OFFER ... |

SERVICE REQUEST HANDLING WITH PROTOCOL TRANSLATION

CROSS-REFERENCE TO RELATED APPLICATION

The present application claims the benefit of Patent Cooperation Treaty (PCT) Application No. PCT/CN2020/140627, filed Dec. 29, 2020. The PCT application is herein incorporated by reference in its entirety.

BACKGROUND

Virtualization allows the abstraction and pooling of hardware resources to support virtual machines in a software-defined data center (SDDC). For example, through server virtualization, virtualized computing instances such as virtual machines (VMs) running different operating systems may be supported by the same physical machine (e.g., referred to as a "host"). Each VM is generally provisioned with virtual resources to run a guest operating system and applications. The virtual resources may include central processing unit (CPU) resources, memory resources, storage resources, network resources, etc. In practice, VMs may require access to various network services, such as configuration service for Internet Protocol (IP) address assignment using dynamic host configuration protocol (DHCP) etc. It is desirable to implement such network services more efficiently in the SDDC.

BRIEF DESCRIPTION OF DRAWINGS

FIG. 5 is a schematic diagram illustrating a first example of service request handling using a first protocol translation approach;

DETAILED DESCRIPTION

Figure 1:
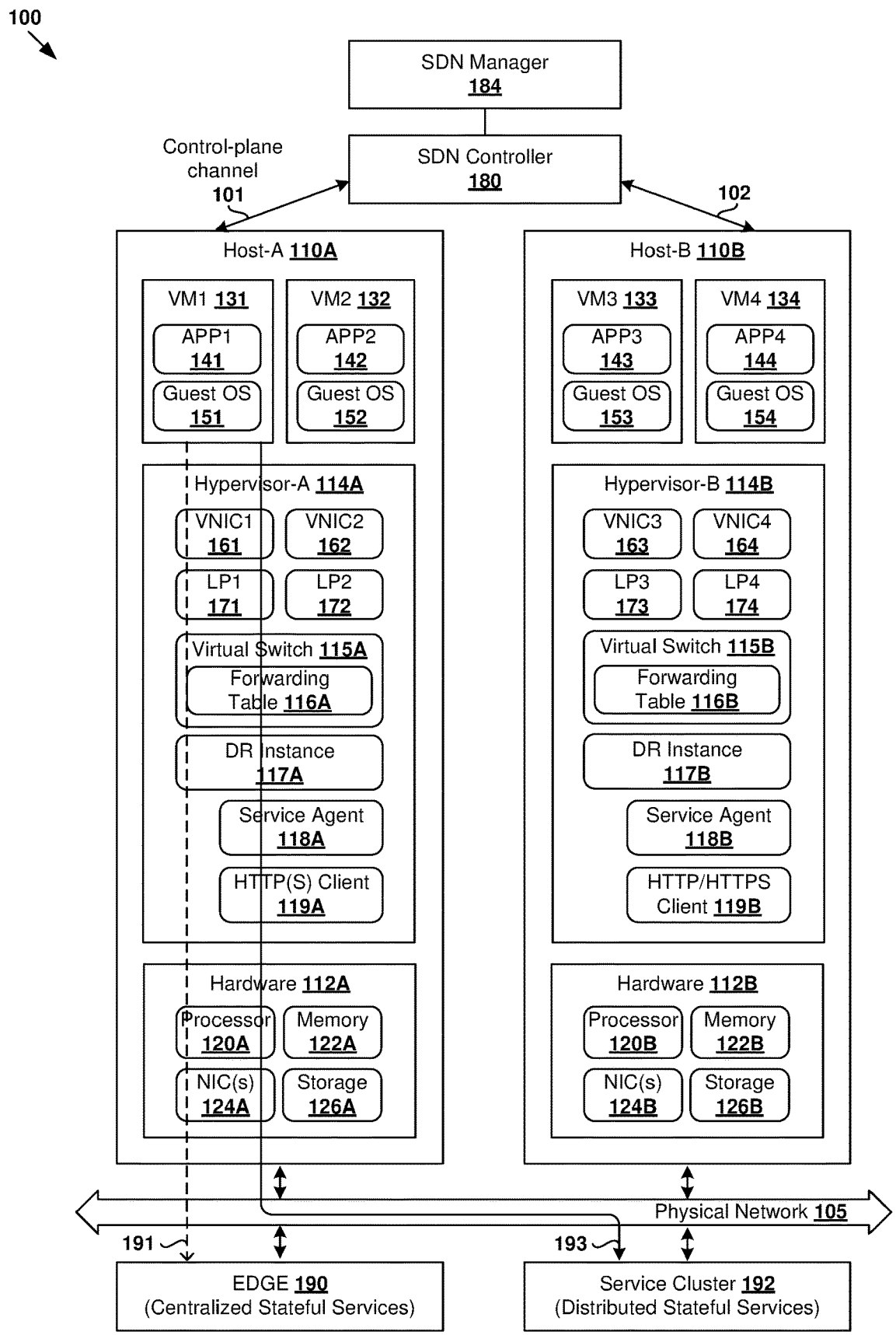
FIG. 1 is a schematic diagram illustrating an example software-defined networking (SDN) environment in which service request handling with protocol translation may be implemented.

According to examples of the present disclosure, service request handling may be implemented in a more efficient manner by steering service requests to service nodes (e.g., 192 in FIG. 1) instead of a centralized network element (e.g., EDGE 190 in FIG. 1). In one example, a computer system may, in response to intercepting a service request (e.g., configuration request) from a virtualized computing instance, generate a translated service request by performing a translation of the service request from a service protocol (e.g., DHCP) to a data exchange protocol (e.g., hypertext transfer protocol (HTTP) and HTTP secure (HTTPS)). The translated service request may then be forwarded by a client node towards a service node that supports the data exchange protocol. On the return path, a service response from the service node may be translated from the data exchange protocol to the service protocol before being forwarded towards the virtualized computing instance.

As will be described further below, examples of the present disclosure (see 192-193 in FIG. 1) should be contrasted against conventional approaches that rely on a centralized network element (see 190-191 in FIG. 1) for service requests. Such conventional approaches may lead to a bottleneck at the centralized network element, especially in a large-scale software defined networking (SDN) environment. Using a cluster of service nodes to alleviate the burden of the centralized network element, examples of the present disclosure may be implemented to improve scalability of network services as well as the performance of hosts and virtual machines (VMs) in the SDN environment.

In the following detailed description, reference is made to the accompanying drawings, which form a part hereof. In the drawings, similar symbols typically identify similar components, unless context dictates otherwise. The illustrative embodiments described in the detailed description, drawings, and claims are not meant to be limiting. Other embodiments may be utilized, and other changes may be made, without departing from the spirit or scope of the subject matter presented here. It will be readily understood that the aspects of the present disclosure, as generally described herein, and illustrated in the drawings, can be arranged, substituted, combined, and designed in a wide variety of different configurations, all of which are explicitly contemplated herein.

FIG. 1 is a schematic diagram illustrating example SDN environment 100 in which service request handling with protocol translation may be performed. It should be understood that, depending on the desired implementation, SDN environment 100 may include additional and/or alternative components than that shown in FIG. 1. Although the terms "first" and "second" are used to describe various elements, these elements should not be limited by these terms. These terms are used to distinguish one element from another. For example, a first element may be referred to as a second element, and vice versa.

SDN environment 100 includes multiple hosts 110A-B that are inter-connected via physical network 105. Each host 110A/110B may include suitable hardware 112A/112B and virtualization software (e.g., hypervisor-A 114A, hypervisor-B 114B) to support various virtual machines (VMs). For example, hosts 110A-B may support respective VMs 131-134. Hardware 112A/112B includes suitable physical components, such as central processing unit(s) or processor(s) 120A/120B; memory 122A/122B; physical network interface controllers (NICs) 124A/124B; and storage disk(s) 126A/126B. Note that SDN environment 100 may include any number of hosts (also known as a "host computers", "host devices", "physical servers", "server systems", "transport nodes," etc.), where each host may be supporting tens or hundreds of VMs.

Hypervisor 114A/114B maintains a mapping between underlying hardware 112A/112B and virtual resources allocated to respective VMs. Virtual resources are allocated to respective VMs 131-134 to support a guest operating system and application(s); see 141-144, 151-154. Any suitable applications 141-144 may be implemented, such as processes/applications labelled "APP1" to "APP4." For example, virtual resources may include virtual CPU, guest physical memory, virtual disk, virtual network interface controller (VNIC), etc. Hardware resources may be emulated using virtual machine monitors (VMMs). For example, VNICs 161-164 are virtual network adapters for respective VMs 131-134. Each VNIC may be emulated by a corresponding VMM (not shown) instantiated by hypervisor 114A/114B. The VMMs may be considered as part of respective VMs, or alternatively, separated from the VMs. Although one-to-one relationships are shown, one VM may be associated with multiple VNICs (each VNIC having its own network address).

Although examples of the present disclosure refer to VMs, it should be understood that a "virtual machine" running on a host is merely one example of a "virtualized computing instance" or "workload." A virtualized computing instance may represent an addressable data compute node (DCN) or isolated user space instance. In practice, any suitable technology may be used to provide isolated user space instances, not just hardware virtualization. Other virtualized computing instances may include containers (e.g., running within a VM or on top of a host operating system without the need for a hypervisor or separate operating system or implemented as an operating system level virtualization), virtual private servers, client computers, etc. Such container technology is available from, among others, Docker, Inc. The VMs may also be complete computational environments, containing virtual equivalents of the hardware and software components of a physical computing system.

The term "hypervisor" may refer generally to a software layer or component that supports the execution of multiple virtualized computing instances, including system-level software in guest VMs that supports namespace containers such as Docker, etc. Hypervisors 114A-B may each implement any suitable virtualization technology, such as VMware ESX® or ESXi™ (available from VMware, Inc.), Kernel-based Virtual Machine (KVM), etc. The term "packet" may refer generally to a group of bits that can be transported together, and may be in another form, such as "frame," "message," "segment," etc. The term "traffic" or "flow" may refer generally to multiple packets. The term "layer-2" may refer generally to a link layer or media access control (MAC) layer; "layer-3" to a network or Internet Protocol (IP) layer; and "layer-4" to a transport layer (e.g., using Transmission Control Protocol (TCP), User Datagram Protocol (UDP), etc.), in the Open System Interconnection (OSI) model, although the concepts described herein may be used with other networking models.

Hypervisor 114A/114B implements virtual switch 115A/115B and logical distributed router (DR) instance 117A/117B to handle egress packets from, and ingress packets to, corresponding VMs. In SDN environment 100, logical switches and logical DRs may be implemented in a distributed manner and can span multiple hosts. For example, logical switches that provide logical layer-2 connectivity, i.e., an overlay network, may be implemented collectively by virtual switches 115A-B and represented internally using forwarding tables 116A-B at respective virtual switches 115A-B. Forwarding tables 116A-B may each include entries that collectively implement the respective logical switches. Further, logical DRs that provide logical layer-3 connectivity may be implemented collectively by DR instances 117A-B and represented internally using routing tables (not shown) at respective DR instances 117A-B. The routing tables may each include entries that collectively implement the respective logical DRs.

Packets may be received from, or sent to, each VM via an associated logical port. For example, logical switch ports 171-174 are associated with respective VMs 131-134. Here, the term "logical port" or "logical switch port" may refer generally to a port on a logical switch to which a virtualized computing instance is connected. A "logical switch" may refer generally to a software-defined networking (SDN) construct that is collectively implemented by virtual switches 115A-B in FIG. 1, whereas a "virtual switch" may refer generally to a software switch or software implementation of a physical switch. In practice, there is usually a one-to-one mapping between a logical port on a logical switch and a virtual port on virtual switch 115A/115B. However, the mapping may change in some scenarios, such as when the logical port is mapped to a different virtual port on a different virtual switch after migration of the corresponding virtualized computing instance (e.g., when the source host and destination host do not have a distributed virtual switch spanning them).

SDN controller 180 and SDN manager 184 are example network management entities in SDN environment 100. One example of an SDN controller is the NSX controller component of VMware NSX® (available from VMware, Inc.) that operates on a central control plane. SDN controller 180 may be a member of a controller cluster (not shown for simplicity) that is configurable using SDN manager 184 operating on a management plane. Network management entity 180/184 may be implemented using physical machine(s), VM(s), or both. Logical switches, logical routers, and logical overlay networks may be configured using SDN controller 180, SDN manager 184, etc. To send or receive control information, a local control plane (LCP) agent (not shown) on host 110A/110B may interact with central control plane (CCP) module 182 at SDN controller 180 via control-plane channel 101/102.

Hosts 110A-B may also maintain data-plane connectivity with each other via physical network 105 to facilitate communication among VMs 131-134. Hypervisor 114A/114B may implement a virtual tunnel endpoint (VTEP) (not shown) to encapsulate and decapsulate packets with an outer header (also known as a tunnel header) identifying the relevant logical overlay network (e.g., VNI). For example in FIG. 1, hypervisor-A 114A implements a first VTEP associated with (IP address=IP-A, VTEP label=VTEP-A). Hypervisor-B 114B implements a second VTEP with (IP-B, VTEP-B). Encapsulated packets may be sent via an end-to-end, bi-directional communication path (known as a tunnel) between a pair of VTEPs over physical network 105.

Through virtualization of networking services in SDN environment 100, logical networks (also referred to as overlay networks or logical overlay networks) may be provisioned, changed, stored, deleted and restored programmatically without having to reconfigure the underlying physical hardware architecture. A logical network may be formed using any suitable tunneling protocol, such as Virtual eXtensible Local Area Network (VXLAN), Stateless Transport Tunneling (STT), Generic Network Virtualization Encapsulation (GENEVE), etc. For example, VXLAN is a layer-2 overlay scheme on a layer-3 network that uses tunnel encapsulation to extend layer-2 segments across multiple hosts which may reside on different layer 2 physical networks. In the example in FIG. 1, VM1 131 on host-A 110A and VM3 133 on host-B 110B may be connected to the same logical switch and located on the same logical layer-2 segment, such as a segment with virtual network identifier (VNI)=6000. This way, stateless networking services such as logical switching and logical routing may be implemented in a distributed manner using hypervisors 114A-B. Some networking services, however, may require centralized state or session management.

Conventionally, EDGE 190 may be deployed as a centralized, logical service router (SR) to provide various centralized stateful services to VMs 131-134. In practice, EDGE 190 may be an entity that is implemented using VM(s) and/or physical bare metal machine(s) to implement various functionalities of a switch, router, bridge, gateway, edge appliance, or any combination thereof. EDGE 190 is generally deployed at the edge of a geographical site at which hosts 110A-B are located. Example centralized stateful services include load balancing, network address translation (NAT), domain name system (DNS), dynamic host configuration protocol (DHCP), metadata proxy, intrusion detection system (IDS), deep packet inspection, etc. Due to the centralized implementation, EDGE 190 may become a bottleneck, especially in a large-scale SDN environment with a large number of hosts and VMs.

Service Request Handling With Protocol Translation

According to examples of the present disclosure, service request handling may be implemented in a more efficient manner by steering service requests from EDGE 190 towards service nodes (see 201-202 in FIG. 2), thereby reducing the likelihood of a bottleneck at EDGE 190 and improving the scalability of network services. For example, instead of relying on EDGE 190 according to conventional centralized approaches (see 191 in FIG. 1), service requests may be translated to a data exchange protocol and redirected towards service cluster 192 (see 193 in FIG. 1). This way, network service implementation may be more efficient and scalable to improve the performance of hosts 110A-B and VMs 131-134.

Figure 2:
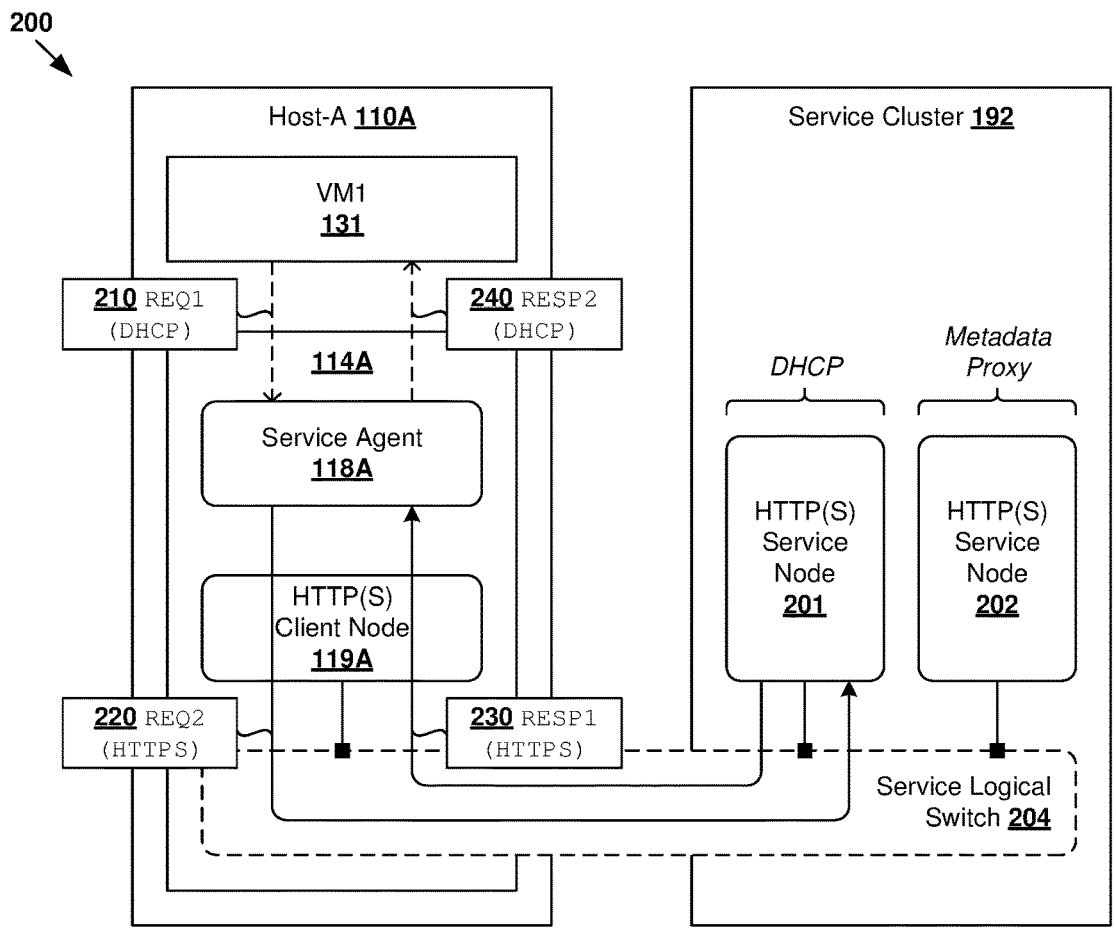
FIG. 2 is a schematic diagram illustrating an example computer system for service request handling with protocol translation.

In more detail, FIG. 2 is a schematic diagram illustrating example computer system 200 to perform service request handling with protocol translation. In the following, various examples will be discussed using host-A 110A as an example "computer system" and VM1 131 running on host-A 110A as an example "virtualized computing instance" and SDN controller 180 as an example "management entity" or "networking controller." To implement service request handling, host-A 110A may support any suitable software and/or hardware component(s), such as service agent 118A and client node 119A supported by hypervisor-A 114A.

Service agent 118A may be configured to perform translation of service requests and service responses from a service protocol (e.g., DHCP) to a data exchange protocol (e.g., HTTP/HTTPS). Client node 119A may be configured to interact with service node 201/202 using the data exchange protocol. Service cluster 192 may include any suitable number of service nodes that are configured for distributed service request handling, such as first service node 201 providing a configuration service using DHCP, second service node 202 providing a metadata proxy service, etc. Note that service nodes 201-202 may be implemented using VM(s) or physical bare metal machine(s). As a load balancing mechanism, multiple service nodes may be configured to implement the same service. service logical switch 204 may be deployed to provide logical connectivity between client node 119A and service nodes 201-202 from service cluster 192.

The example in FIG. 2 will be discussed using FIG. 3, which is a flowchart of example process 300 for a computer system to perform service request handling with protocol translation. Example process 300 may include one or more operations, functions, or actions illustrated by one or more blocks, such as 310 to 360. The various blocks may be combined into fewer blocks, divided into additional blocks, and/or eliminated depending on the desired implementation.

Figure 3:
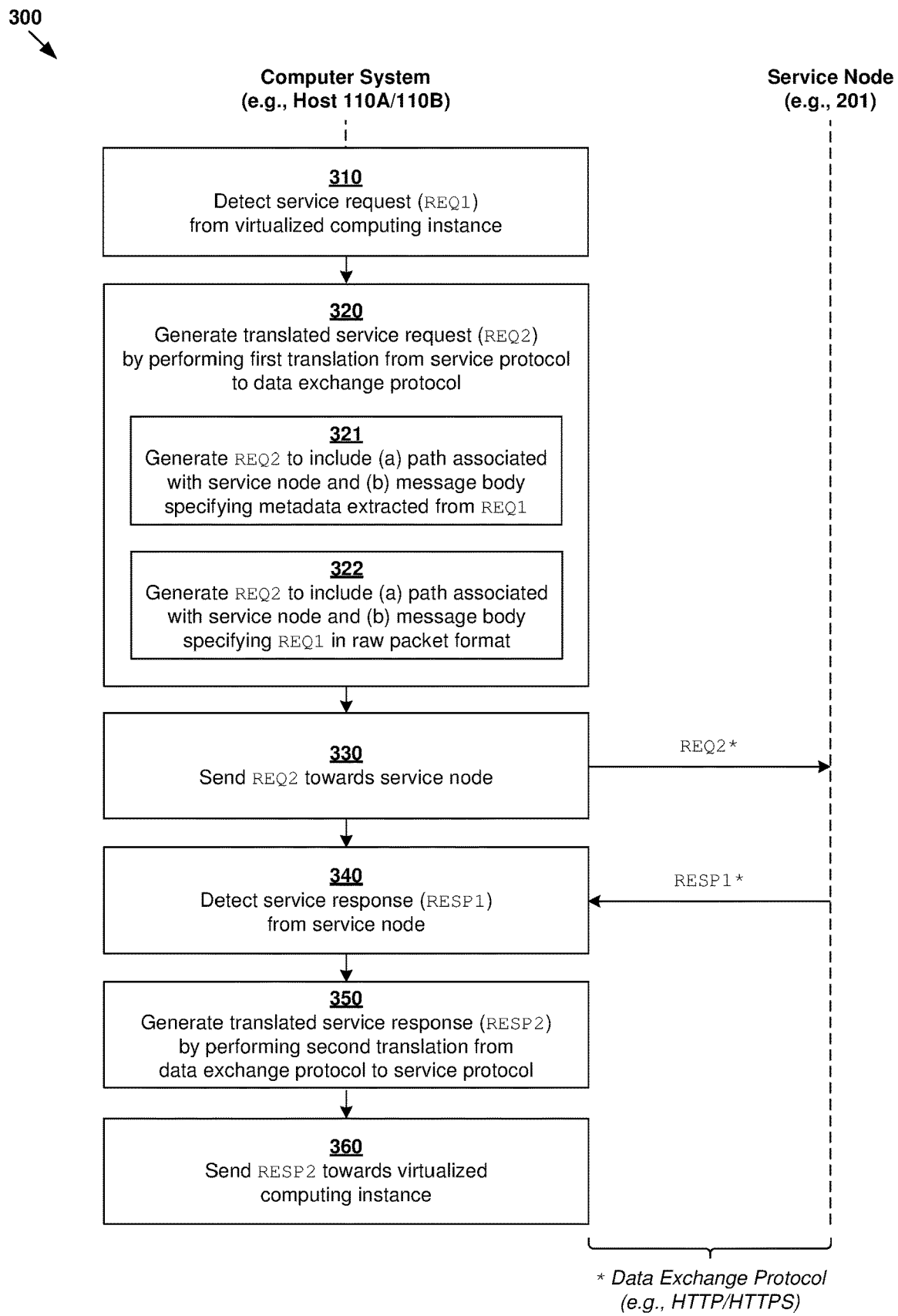
FIG. 3 is a flowchart of an example process for a computer system to perform service request handling with protocol translation.

At 210 in FIGS. 2 and 310 in FIG. 3, host-A 110A (e.g., service agent 118A) may detect or intercept, from VM1 131, a service request that is generated according to a service protocol. Here, the term "service protocol" may refer generally to a protocol used by VM1 131 to generate a request for a particular service. For example, the "service" may be a stateful service that is conventionally provided by EDGE 190, such as configuration service using DHCP, metadata proxy service, etc. The service request is denoted as "REQ1" in FIG. 2.

At 220 in FIGS. 2 and 320-330 in FIG. 3, in response to detecting the service request, host-A 110A (e.g., service agent 118A) may generate a translated service request and send the translated service request using client node 119A towards service node 201. Block 320 may involve performing a first protocol translation of the service request from the service protocol (e.g., DHCP) to a data exchange protocol (e.g., HTTP/HTTPS) that is supported by both client node 119A and service node 201 from service cluster 192. The translated service request (e.g., HTTP/HTTPS request) may be forwarded to cause service node 201 to respond with a service response (e.g., HTTP/HTTPS response) that is generated according to the data exchange protocol. The translated service request is denoted as "REQ2" in FIG. 2.

Figure 4:
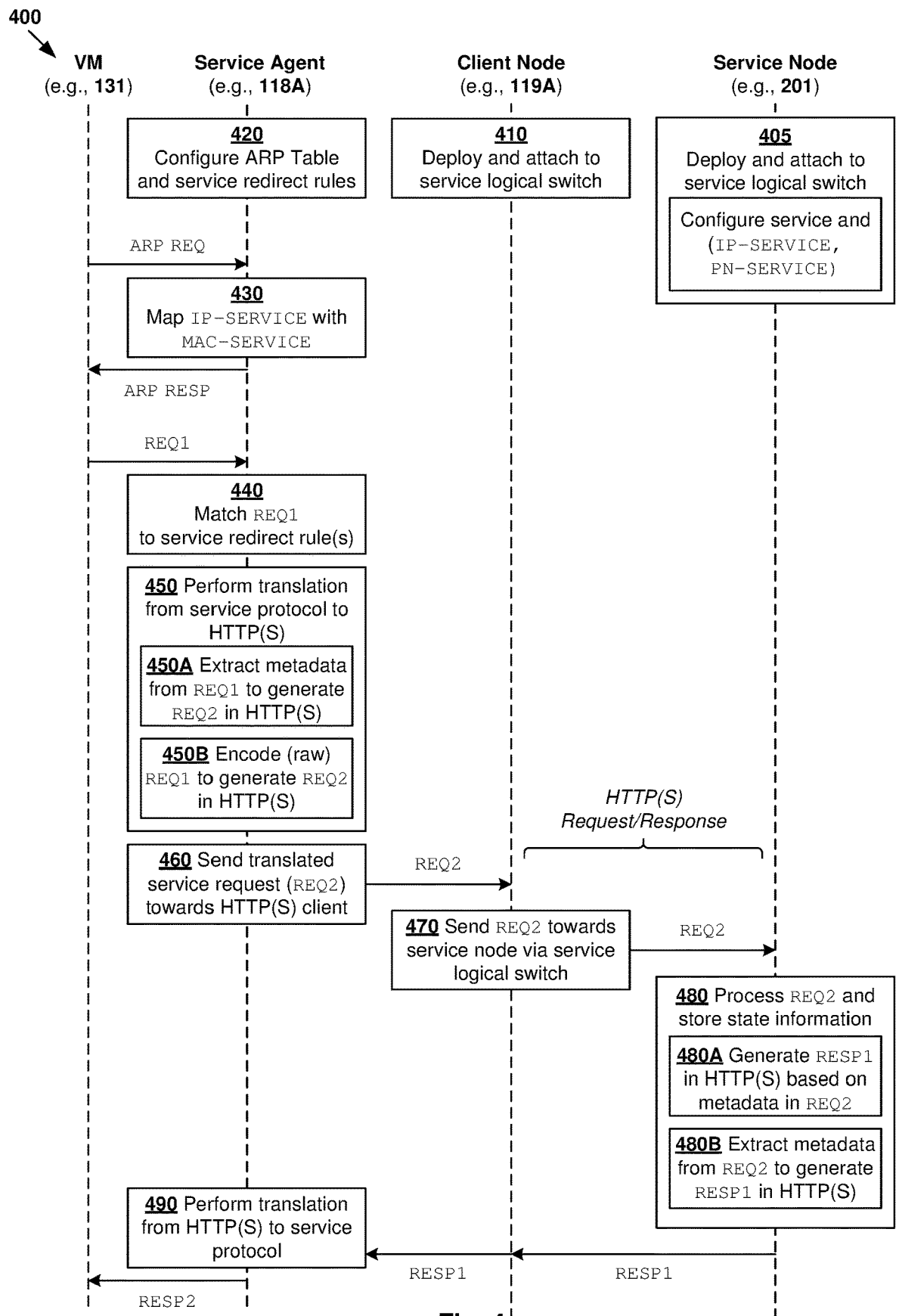
FIG. 4 is a flowchart of an example detailed process for service request handling with protocol translation.

At 230-240 in FIGS. 2 and 340-360 in FIG. 4, in response to detecting the service response from service node 201, host-A 110A may generate a translated service response and forward the translated service response towards VM1 131. Block 350 may involve performing a second protocol translation of the service response from the data exchange protocol (e.g., HTTP/HTTPS to the service protocol (e.g., DHCP). The service response and translated service response are denoted as "RESP1" and "RESP2" respectively in FIG. 2. Using examples of the present disclosure, the first translation at block 320 and second translation at block 350 may be performed in a transparent manner without necessitating any further action(s) or modification(s) at VM1 131. Example translation approaches will be discussed further using FIGS. 4-6.

As used herein, the term "data exchange protocol" may refer generally to a network communications protocol with a defined syntax to transfer or exchange data between a client (e.g., 119A) and a server (e.g., 201/202). Example data exchange protocols include HTTP using TCP port 80, HTTPS using TCP port 443, or the like. For example, HTTP protocol version (HTTP 1.1) is described in the Internet Engineering Task Force (IETF) RFC 2616 as well as RFC 2068 and RFCs 7230-7237, which are incorporated herein by reference. HTTPS is a communications protocol for secure HTTP communications over a network and is described in the IETF RFC 2818, which is incorporated herein by reference. One example HTTPS implementation may involve layering the HTTP on top of the Secure Socket Layer/Transport Layer Security (SSL/TLS) protocol, thus adding security capabilities of SSL/TLS to standard HTTP communications.

There are various benefits of using a data exchange protocol such as HTTP/HTTPS. In general, HTTP is a stateless application-level request/response protocol that uses extensible semantics and self-descriptive message payloads for flexible interaction with network-based hypertext information systems. Being a "stateless" protocol, each request message may be processed in isolation. HTTP/HTTPS may be used to improve the ease of service deployment as well as the scaling out of services in SDN environment 100. For example, service nodes 201-202 may be implemented using well-developed HTTP/HTTPS technology stack to achieve better development efficiency and scalability. Also, HTTP/HTTPS may be used to hide the details of how a service is implemented by service node 201/202 by presenting a uniform interface to client node 119A that is independent of the services provided. The result is a protocol that may be used effectively in many different contexts and for which service implementations might evolve over time.

Using HTTPS, security may be enhanced during service request handling compared to the conventional approaches that rely on such a logical overlay tunnel, which may be susceptible to attacks by malicious third parties. In the following, "HTTP(S)" may refer to HTTP or HTTPS. Any suitable service node deployment approach may be implemented together with the examples of the present disclosure. For example, if service node 201/202 is running on an overlay, service requests and responses may be encapsulated (e.g., GENEVE). If service node 201/202 is deployed on a physical network, it is not necessary to encapsulate HTTP(S) requests destined for HTTP(S) service node 201/202. If service node 201/202 node is running on a cloud, service requests and responses may be forwarded as part of the cloud traffic using any suitable cloud network fabric. If service node 201/202 is running on a physical network, service requests and responses may be forwarded via the physical network. Any additional and/or alternative approach may be used.

Service Configuration

FIG. 4 is a flowchart of example detailed process 400 for a computer system to perform service request handling with protocol translation. Example process 400 may include one or more operations, functions, or actions illustrated at 405 to 490. The various operations, functions or actions may be combined into fewer blocks, divided into additional blocks, and/or eliminated depending on the desired implementation.

(a) Service Cluster Configuration

At 405 in FIG. 4, service cluster 192 may be deployed in SDN environment 100, such as in the form of a web cluster that implements a multi-tier, distributed web service. In one example, service cluster 192 may be configured to be "cloud native" or a service running on a cloud. Here, the term "cloud native" may refer generally to implementing service cluster 192 as an infrastructure of the cloud. During the deployment process, SDN controller 180 may initialize multiple (N) service nodes within service cluster 192 and push service logic to the service nodes. Block 405 may further involve attaching service nodes 201-202 to service logical switch 204 associated with a service network. Service logical switch 204 may span multiple host(s) supporting client node(s) as well as physical machine(s) supporting service node(s).

For each service node, a service IP address ("IP-SERVICE") and a service port number ("PN" or "PN-SERVICE") may be configured. In the example in FIG. 2, first service node 201 providing a DHCP service may be configured with (service IP address=IP-DHCP, service PN=67). Second service node 202 providing a metadata proxy service may be configured with (service IP address=IP-MP, service PN=80). The service PN may be a UDP or TCP port number. Service cluster 192 may register to provide SDN controller 180 (or any other cloud network controller) with a management representational state transfer (REST) application programming interface (API). The REST API may be used to configure service nodes to implement respective logical network services.

(b) Host Configuration

At 410 in FIG. 4, SDN controller 180 may configure HTTP(S) client node 119A on hypervisor-A 110A to facilitate service request handling. Block 410 may involve attaching HTTP(S) client node 119A to service logical switch 204 to connect with the same service network as service nodes 201-202. Here, service logical switch 204 may provide logical connectivity between HTTP(S) client node 119A running on hypervisor-A 114A and HTTP(S) service nodes 201-202 within service cluster 192. HTTP(S) client node 119A may be configured with a client's IP address to interact with HTTP(S) service node 201/202, such as a VTEP IP address assigned to a VTEP on hypervisor-A 114A to reuse the VTEP network for service request handling.

At 420 in FIG. 4, SDN controller 180 may configure service agent 118A on hypervisor-A 110A to facilitate service request handling. To intercept service requests, service agent 118A may be a module operating in a kernel mode along a data path on hypervisor-A 114A. Block 420 may involve configuring an ARP table and service redirect rules on service agent 118A to steer service requests towards service cluster 192 instead of EDGE 190. Each service redirect rule may include match field(s) and corresponding action(s) in the event of a match. The match field(s) may be defined using header and/or payload information of a packet. Example header information (e.g., flow tuples) include source IP address, source PN, destination IP address, destination PN, protocol, direction (e.g., egress or ingress), or any combination thereof.

In the example in FIG. 2, an ARP table (see 250) may be configured to handle any ARP requests from VMs 131-132. For example, in response to detecting or intercepting a broadcast ARP request to resolve a service IP address (e.g., IP-SERVICE), service agent 118A may respond with an ARP response that provides a mapping between IP-SERVICE and a corresponding service MAC address (e.g., MAC-SERVICE). This way, service agent 118A may handle ARP requests associated with services provided by service cluster 192 without broadcasting them.

Further, a set of service redirect rules (see 260) may be configured for service nodes 201-202. For DHCP service node 201, first redirect rule 261 may be configured to detect a DHCP request that is addressed to destination IP address (DIP)=255.255.255.255 (i.e., broadcast address) and destination PN (DPN)=67. If there is match, the broadcast address may be replaced by a (unicast) service IP address=IP-DHCP may be generated to steer the service request towards DHCP service node 201. Second redirect rule 262 may be configured to detect a service request that is addressed to (DIP=IP-DHCP, DPN=67) associated with DHCP. If there is match, the service request may be translated into a HTTP(S) request.

Service redirect rules may also be configured for other services, including a metadata proxy service provided by service node 202. For example, third service redirect rule 263 may be configured to detect service requests that are addressed to (DIP=IP-SERVICE, DPN=PN-SERVICE), where IP-SERVICE is a service IP address and PN-SER- VICE is an associated service PN. Any alternative or additional match field(s) may be used to define service redirect rules.

Example Service Over HTTP(S)

Figure 6:
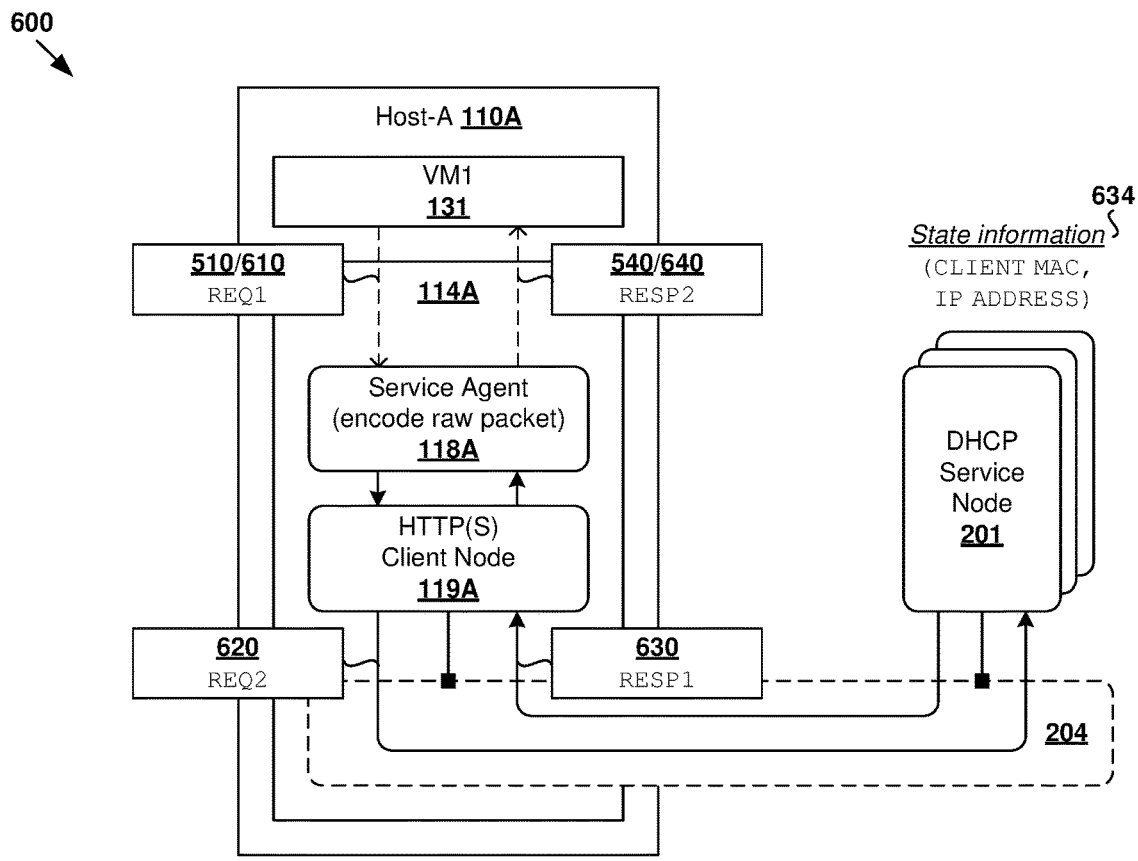
FIG. 6 is a schematic diagram illustrating a second example of service request handling using a second protocol translation approach.

In the following, FIG. 4 will be explained using FIG. 5 and FIG. 6. FIG. 5 is schematic diagram illustrating first example 500 of service request handling using a first translation approach. FIG. 6 is schematic diagram illustrating second example 600 of service request handling using a second translation approach. In both examples, DHCP service node 201 may provide a host configuration service to assign an IP address to VM1 131. Using a first translation approach in FIG. 5, service agent 118A may be configured to parse service requests to extract metadata. In contrast, using a second translation approach in FIG. 6, service agent 118A may be a relatively lightweight agent that is configured to encode service requests in raw packet format.

In both FIGS. 5-6, DHCP service node 201 may provide a host configuration service to assign an IP address to VM1 131. DHCP may also be used to assign other configuration parameters, such as a subnet mask, a default gateway, a Domain Name Service (DNS) server address, etc. DHCP operations generally fall into four phases: (1) a DHCP client performing DHCP server discovery by sending a DHCP Discover message; (2) DHCP service node 201 performing IP lease offer by sending a DHCP Offer message; (3) the DHCP client accepting the offer by sending a DHCP Request message; and (4) DHCP service node 201 returns a DHCP Acknowledgement (ACK) or Negative ACK (NACK) message to the DHCP client.

(a) First Translation

At 440 in FIG. 4, in response to detecting a service request from VM1 131, service agent 118A may determine whether there is a matching service redirect rule based on header and/or payload information in the service request. Referring to 510 in FIG. 5, service agent 118A may intercept or detect a service request in the form of a DHCP Discover message broadcasted by VM1 131. DHCP Discover message 510 may specify a transaction ID (e.g., "0xc18ceb14"), client MAC address (e.g., "VM_99:d3:48 (00:50:56:99:d3:48)"), DIP=255.255.255.255 (i.e., broadcast address), DPN=67 and a requested IP address=2.2.2.99 by VM1 131.

At 450 in FIG. 4, service agent 118A may perform a translation from DHCP to HTTP(S) based on service redirect rules 261-262 in FIG. 2. For example, in response to matching DHCP discover message 510 to first service redirect rule 261 based on (DIP=255.255.255.255, DPN=67), service agent 118A may identify service IP address=IP-DHCP associated with DHCP service node 201. Next, based on second service redirect rule 262, service agent 118A may perform translation to generate HTTP(S) request message 520. Any suitable approach may be used to perform the translation to generate a translated service request=HTTP(S) request message. Two translation approaches (see 450A-B in FIG. 4) are discussed below.

(1) In the example in FIG. 5, a first translation approach may involve service agent 118A extracting metadata from a service request to generate the translated service request. For example, service agent 118A may parse DHCP discover message 510 to extract any suitable metadata (e.g., key-value pair) to generate HTTP(S) request message 520. Example extracted metadata may include <transaction ID>, <client MAC address> associated with VM1 131, <option field with code 53> indicating the DHCP message type, <option field with code 50> indicating a requested IP address, <option field with code 55> specifying a parameter request list, etc. This way, HTTP(S) request message 520 may be generated to include a message body specifying the extracted metadata.

In practice, HTTP request messages may be configured to include a number of elements according to a defined syntax, such as (1) an HTTP method such as a verb (e.g., PUT, GET or POST) or a noun (e.g., OPTIONS or HEAD); (2) a path or a uniform resource locator (URL) associated with service node 201/202; (3) a payload or message body to convey additional information. In the example in FIG. 5, HTTP(S) request message 520 may specify verb="HTTPS PUT" and path="https://dhcp-service-http-server>/api/v1/dhcp-client" (see 521) associated with DHCP service node 201. The "PUT" request method is to create a new resource with a message body (see 522) specifying any suitable extracted metadata, such as <transaction ID>, <client MAC address>, <option field with code 53>, <option field with code 50>, <option field with code 55>, etc.

(2) In the example in FIG. 6, a second translation approach may involve encoding a DHCP discover message (see 610) in a raw packet format to generate a HTTP(S) request message (see 620). Here, HTTP(S) request message 620 specifies verb="HTTPS PUT" and path="https://dhcp-service-http-server>/api/v1/dhcp-client" (see 621) associated with DHCP service node 201. The message body (see 622), however, may include a series of hexadecimal values of DHCP discover message 610 in the raw packet format. Compared to the first approach in FIG. 5 that requires service agent 118A capable of metadata extraction, the second approach in FIG. 6 may be implemented using a more lightweight service agent 118A.

At 460-470 in FIG. 4, service agent 118A may send or forward HTTP(S) request message 520/620 towards client node 119A to cause subsequent forwarding towards DHCP service node 201 via service logical switch 204. This way, instead of broadcasting the original DHCP discover message 510/610 intercepted from VM1 131, examples of the present disclosure may be implemented to perform translation and steer the translated service request towards service cluster 192 instead of EDGE 190.

(b) Service Node Processing

At 480 in FIG. 4, DHCP service node 201 may process HTTP(S) request message 520/620 and store any suitable state information associated with the stateful service provided. Block 480 may involve determining that an IP address assignment is required and generate HTTP(S) response message 530/630 accordingly. Depending on the translation approach used by service agent 118A, DHCP service node 201 may generate HTTP(S) response message 530/630 as follows.

(1) In the example in FIG. 5, DHCP service node 201 may generate HTTP(S) response message 530 based on metadata (see 522) in HTTP(S) request message 520. Here, HTTP(S) response message 530 may be generated according to a defined syntax to include status code="HTTPS RESPONSE CODE: 200" and status message="OK" (see 531) followed by headers (see 532) and a message body (see 533). The message body may include any suitable metadata extracted from a DHCP offer message, such as <transaction ID>, <client MAC address>, <option field with code 53>, <option field with code 54>, <option field with code 51>, etc. HTTP(S) response message 530 is then sent to client node 119A via service logical switch 204. In practice, DHCP service node 201 may store any suitable state information (see 534) associated with the IP address assignment (i.e., a stateful service), including mapping=(client MAC address, assigned IP address).

(2) In the example in FIG. 6, DHCP service node 201 may generate HTTP(S) response message 630 by parsing the message body (see 622) of HTTP(S) request message 520 to extract any suitable metadata. Next, DHCP service node 201 may generate a DHCP offer message in a raw packet format (see 633) and encode the DHCP offer message in HTTP(S). Similar to FIG. 5, HTTP(S) response message 630 may be generated according to a defined syntax to include status code="HTTPS RESPONSE CODE: 200" and status message="OK" (see 631) followed by some headers (see 632) and a message body (see 633) specifying the DHCP offer message in raw packet format. HTTP(S) response message 630 is then sent by service node 201 to client node 119A via service logical switch 204. DHCP service node 201 may also store any suitable state information (see 634), including (client MAC address, assigned IP address).

(c) Second Translation

At 490 in FIG. 4, in response to receiving HTTP(S) response message 530/630 from DHCP service node 201 via client node 119A and service logical switch 204, service agent 118A may perform a second translation to generate DHCP service response 540/640. In the example in FIG. 5, block 490 may involve service agent 118A generating DHCP offer message 540 based on metadata in HTTP(S) response message 530, such as <transaction ID>, <client MAC address>, <option field with code 53>, <option field with code 54>, <option field with code 51>, etc. In the example in FIG. 6, block 490 may involve service agent 118A parsing message body 633 (i.e., raw packet format) of HTTP(S) response message 630 to extract the relevant metadata to generate DHCP offer message 640. In both cases, DHCP offer message 540/640 may be addressed from source IP address=2.2.2.1 to destination IP address=2.2.2.99 that is assigned to VM1 131 by DHCP service node 201.

As explained above, examples of the present disclosure may be implemented to improve the scalability and performance of stateful services that are conventionally implemented by EDGE 190. Depending on the desired implementation, a combination of centralized and distributed approaches may be implemented. For example, a subset of centralized stateful services (e.g., DHCP, metadata proxy) that do not require physical datapath connectivity may be redirected from EDGE 190 to service cluster 192. Here, service cluster 192 may physically connect with EDGE 190 if the latter redirects to service cluster 192. This means that service cluster 192 may not have direct physical connectivity with client node 119A or hypervisor 114A. As such, logically, service node 201 may be hidden from client node 119A. Stateless services (e.g., logical switching and routing) may be implemented by hypervisors 114A-B using respective virtual switches 115A-B and DR instances 117A-B.

Service Scaling

Figure 7:
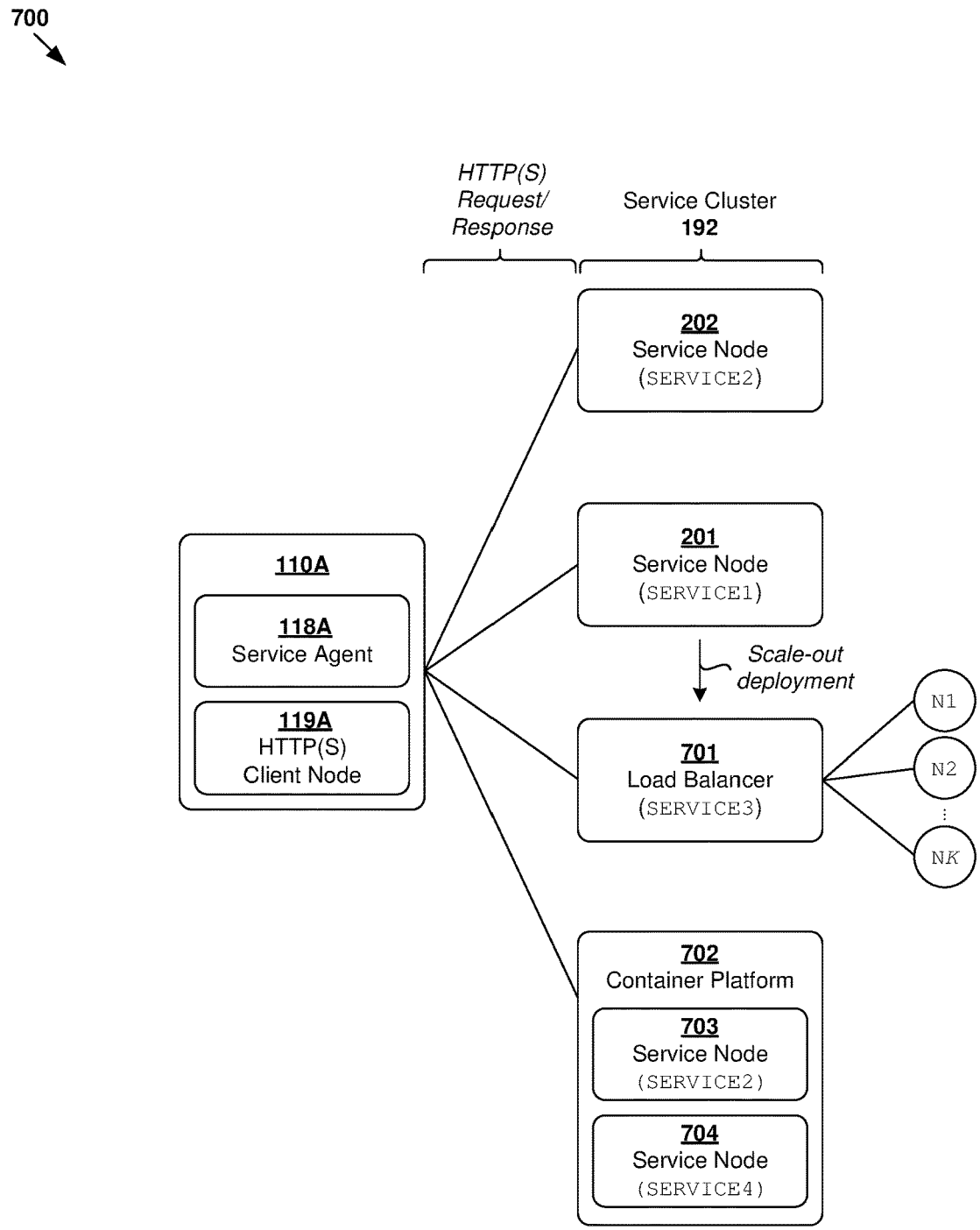
FIG. 7 is a schematic diagram illustrating example service scaling for a service cluster.

FIG. 7 is a schematic diagram illustrating example service scaling 700 for service cluster 192. In this example, a one-to-multiple mapping is shown where one pair of service agent 118A and client node 119A is configured to interact with multiple service nodes during service request handling. Once the performance of a configured service node becomes a bottleneck, service nodes within service cluster 192 may be scaled out using any suitable approach. In one example, load balancing may be implemented, such as on a logical switch universally unique identifier (UUID) or other parameter for task sharding among service nodes. In the example in FIG. 7, service traffic may be redirected towards a load balancer (see 701) that distributes service requests among a group of multiple (K) service nodes (denoted as N1-NK).

Another scaling-out strategy (see 702) may involve deployment of service nodes on any suitable container-based platform, such as service nodes 703-704. One example is Kubernetes® (abbreviated as "K8s"), which is a container orchestration platform that is designed to simplify the deployment and management of cloud-native applications at scale. Kubernetes may be implemented to provide a container-centric infrastructure for the deployment, scaling and operations of application containers across clusters of hosts. Since its inception, Kubernetes has become one of the most popular platforms for deploying containerized applications. Kubernetes defines a networking model for its container-based resources, while the implementation of the networking model is provided by network plugins. Any alternative or additional platform(s) may be used.

Container Implementation

Although explained using VMs, it should be understood that public cloud environment 100 may include other virtual workloads, such as containers, etc. As used herein, the term "container" (also known as "container instance") is used generally to describe an application that is encapsulated with all its dependencies (e.g., binaries, libraries, etc.). In the examples in FIG. 1 to FIG. 7, container technologies may be used to run various containers inside respective VMs 131-134. Containers are "OS-less", meaning that they do not include any OS that could weigh 10 s of Gigabytes (GB). This makes containers more lightweight, portable, efficient and suitable for delivery into an isolated OS environment. Running containers inside a VM (known as "containers-on-virtual-machine" approach) not only leverages the benefits of container technologies but also that of virtualization technologies. The containers may be executed as isolated processes inside respective VMs.

Computer System

The above examples can be implemented by hardware (including hardware logic circuitry), software or firmware or a combination thereof. The above examples may be implemented by any suitable computing device, computer system, etc. The computer system may include processor(s), memory unit(s) and physical NIC(s) that may communicate with each other via a communication bus, etc. The computer system may include a non-transitory computer-readable medium having stored thereon instructions or program code that, when executed by the processor, cause the processor to perform process(es) described herein with reference to FIG. 1 to FIG. 7. For example, the instructions or program code, when executed by the processor of the computer system, may cause the processor to implement examples of the present disclosure.

The techniques introduced above can be implemented in special-purpose hardwired circuitry, in software and/or firmware in conjunction with programmable circuitry, or in a combination thereof. Special-purpose hardwired circuitry may be in the form of, for example, one or more application-specific integrated circuits (ASICs), programmable logic devices (PLDs), field-programmable gate arrays (FPGAs), and others. The term 'processor' is to be interpreted broadly to include a processing unit, ASIC, logic unit, or programmable gate array etc.

The foregoing detailed description has set forth various embodiments of the devices and/or processes via the use of block diagrams, flowcharts, and/or examples. Insofar as such block diagrams, flowcharts, and/or examples contain one or more functions and/or operations, it will be understood by those within the art that each function and/or operation within such block diagrams, flowcharts, or examples can be implemented, individually and/or collectively, by a wide range of hardware, software, firmware, or any combination thereof.

Those skilled in the art will recognize that some aspects of the embodiments disclosed herein, in whole or in part, can be equivalently implemented in integrated circuits, as one or more computer programs running on one or more computers (e.g., as one or more programs running on one or more computing systems), as one or more programs running on one or more processors (e.g., as one or more programs running on one or more microprocessors), as firmware, or as virtually any combination thereof, and that designing the circuitry and/or writing the code for the software and or firmware would be well within the skill of one of skill in the art in light of this disclosure.

Software and/or to implement the techniques introduced here may be stored on a non-transitory computer-readable storage medium and may be executed by one or more general-purpose or special-purpose programmable microprocessors. A "computer-readable storage medium", as the term is used herein, includes any mechanism that provides (i.e., stores and/or transmits) information in a form accessible by a machine (e.g., a computer, network device, personal digital assistant (PDA), mobile device, manufacturing tool, any device with a set of one or more processors, etc.). A computer-readable storage medium may include recordable/non recordable media (e.g., read-only memory (ROM), random access memory (RAM), magnetic disk or optical storage media, flash memory devices, etc.).

The drawings are only illustrations of an example, wherein the units or procedure shown in the drawings are not necessarily essential for implementing the present disclosure. Those skilled in the art will understand that the units in the device in the examples can be arranged in the device in the examples as described or can be alternatively located in one or more devices different from that in the examples. The units in the examples described can be combined into one module or further divided into a plurality of sub-unit.

We claim:

1. A method for a computer system to perform service request handling with protocol translation, wherein the method comprises:
   in response to intercepting, from a virtualized computing instance running on the computer system, a service request that is generated according to a service protocol,
      generating a translated service request by performing a first translation of the service request from the service protocol to a data exchange protocol supported by both a client node running on the computer system and a service node; and
      sending, via the client node, the translated service request towards a service cluster, instead of a centralized network element that provides stateful services, wherein the service cluster includes the service node to cause the service node to respond with a service response and at least one other service node configured for distributed service request handling; and
   in response to receiving, from the service node, the service response that is generated according to the data exchange protocol,
      generating a translated service response by performing a second translation of the service response from the data exchange protocol to the service protocol; and
      sending the translated service response, being a response to the service request, towards the virtualized computing instance.

2. The method of claim 1, wherein intercepting the service request comprises:
   determining whether there is a matching service redirect rule based on the service request, wherein the service redirect rule specifies (a) one or more match fields associated with a service provided by the service node and (b) an action to perform the translation.

3. The method of claim 1, wherein sending the translated service request comprises:
   sending the translated service request via a service logical switch that provides logical connectivity between the client node and the service node.

4. The method of claim 1, wherein generating the translated service request comprises:
   generating, by a service agent running on the computer system, the translated service request to include (a) a path associated with the service node and (b) a message body specifying metadata extracted from the service request to cause the service node to respond with the translated service response based on the metadata.

5. The method of claim 1, wherein generating the translated service request comprises:
   generating, by a service agent running on the computer system, the translated service request to include (a) a path associated with the service node and (b) a message body specifying the service request in a raw packet format to cause the service node to extract metadata from the service request and respond with the translated service response.

6. The method of claim 1, wherein generating the translated service request comprises:
   generating the translated service request by performing the translation to the data exchange protocol in the form of HyperText Transfer Protocol (HTTP) or HTTP Secure (HTTPS) supported by both the client node and the service node.

7. A non-transitory computer-readable storage medium that includes a set of instructions which, in response to execution by a processor of a computer system, cause the processor to perform service request handling with protocol translation, wherein the method comprises:
   in response to intercepting, from a virtualized computing instance running on the computer system, a service request that is generated according to a service protocol,
      generating a translated service request by performing a first translation of the service request from the service protocol to a data exchange protocol supported by both a client node running on the computer system and a service node; and
      sending, via the client node, the translated service request towards a service cluster, instead of a centralized network element that provides stateful services, wherein the service cluster includes the service node to cause the service node to respond with a service response and at least one other service node configured for distributed service request handling; and in response to receiving, from the service node, the service response that is generated according to the data exchange protocol,
generating a translated service response by performing a second translation of the service response from the data exchange protocol to the service protocol; and
sending the translated service response, being a response to the service request, towards the virtualized computing instance.

8. The non-transitory computer-readable storage medium of claim 7, wherein intercepting the service request comprises:
determining whether there is a matching service redirect rule based on the service request, wherein the service redirect rule specifies (a) one or more match fields associated with a service provided by the service node and (b) an action to perform the translation.

9. The non-transitory computer-readable storage medium of claim 7, wherein sending the translated service request comprises:
sending the translated service request via a service logical switch that provides logical connectivity between the client node and the service node.

10. The non-transitory computer-readable storage medium of claim 7, wherein generating the translated service request comprises:
generating, by a service agent running on the computer system, the translated service request to include (a) a path associated with the service node and (b) a message body specifying metadata extracted from the service request to cause the service node to respond with the translated service response based on the metadata.

11. The non-transitory computer-readable storage medium of claim 7, wherein generating the translated service request comprises:
generating, by a service agent running on the computer system, the translated service request to include (a) a path associated with the service node and (b) a message body specifying the service request in a raw packet format to cause the service node to extract metadata from the service request and respond with the translated service response.

12. The non-transitory computer-readable storage medium of claim 7, wherein generating the translated service request comprises:
generating the translated service request by performing the translation to the data exchange protocol in the form of HyperText Transfer Protocol (HTTP) or HTTP Secure (HTTPS) supported by both the client node and the service node.

13. A host, comprising a processor, further comprising:
a virtualized computing instance;
a client node; and
a service agent to perform the following:
in response to intercepting, from the virtualized computing instance, a service request that is generated according to a service protocol,
generating a translated service request by performing a first translation of the service request from the service protocol to a data exchange protocol supported by both the client node and a service node; and
sending, via the client node, the translated service request towards a service cluster, instead of a centralized network element that provides stateful services, wherein the service cluster includes the service node to cause the service node to respond with a service response and at least one other service node configured for distributed service request handling; and in response to receiving, from the service node, the service response that is generated according to the data exchange protocol,
generating a translated service response by performing a second translation of the service response from the data exchange protocol to the service protocol; and
sending the translated service response, being a response to the service request, towards the virtualized computing instance.

14. The host of claim 13, wherein the service agent is to intercept the service request by performing the following:
determine whether there is a matching service redirect rule based on the service request, wherein the service redirect rule specifies (a) one or more match fields associated with a service provided by the service node and (b) an action to perform the translation.

15. The host of claim 13, wherein the service agent is to send the translated service request by performing the following:
send the translated service request via a service logical switch that provides logical connectivity between the client node and the service node.

16. The host of claim 13, wherein the service agent is to generate the translated service request by performing the following:
generate the translated service request to include (a) a path associated with the service node and (b) a message body specifying metadata extracted from the service request to cause the service node to respond with the translated service response based on the metadata.

17. The host of claim 13, wherein the service agent is to generate the translated service request by performing the following:
generate the translated service request to include (a) a path associated with the service node and (b) a message body specifying the service request in a raw packet format to cause the service node to extract metadata from the service request and respond with the translated service response.

18. The host of claim 13, wherein the service agent is to generate the translated service request by performing the following:
generate the translated service request by performing the translation to the data exchange protocol in the form of HyperText Transfer Protocol (HTTP) or HTTP Secure (HTTPS) supported by both the client node and the service node.

* * * * *